Patented Oct. 21, 1952

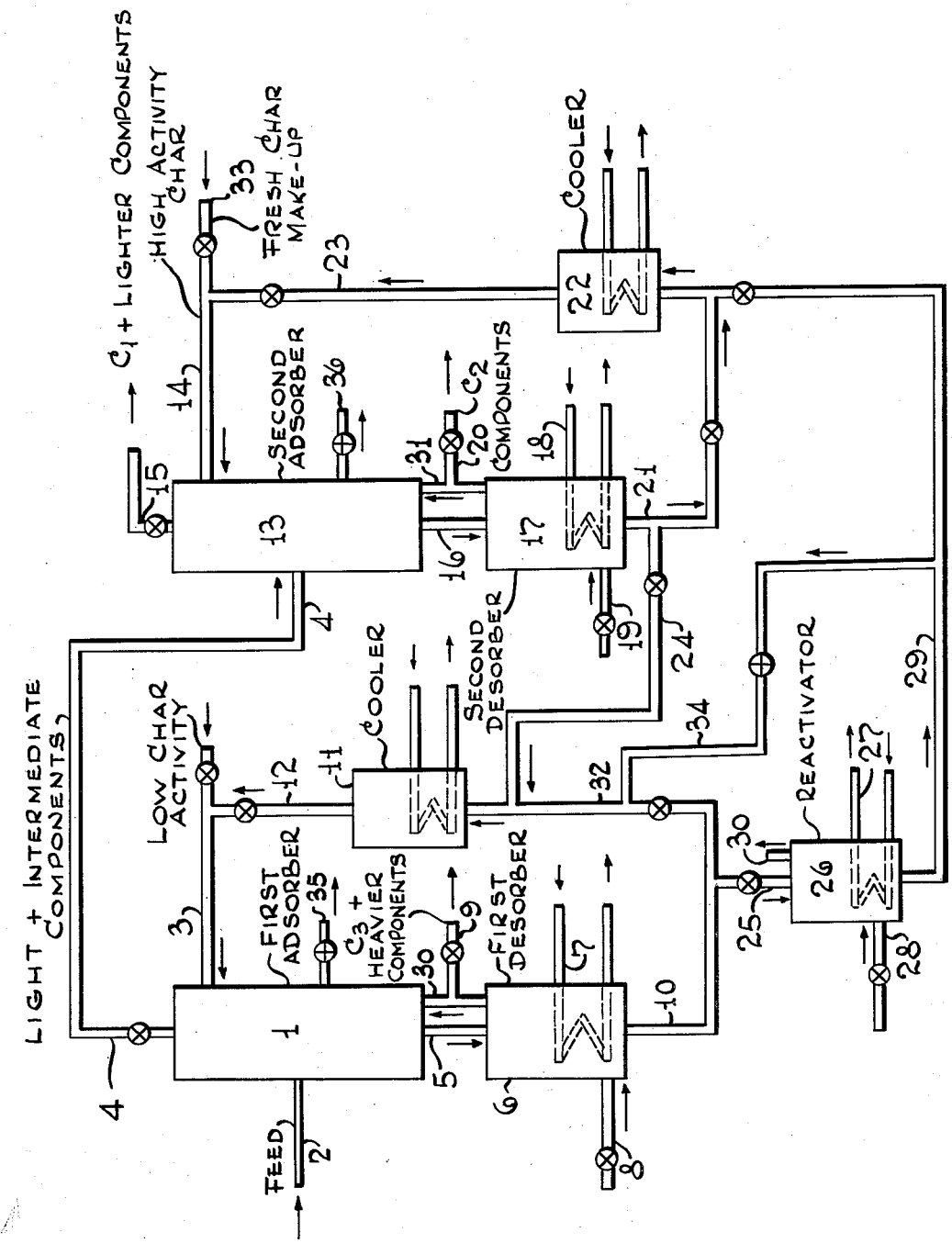

2,614,657

UNITED STATES PATENT OFFICE 2,614,657

ADSORPTION OF GASES WITH CHARCOALS HAVING DIFFERENT ACTIVITIES

Edward W. S. Nicholson and Robert J. Fritz, Baton Rouge, La., and Lewis D. Etherington, Cranford, N. J., assignors to Standard Oil Development Company, a corporation of Delaware Application June 19, 1951, Serial No. 232,308

13 Claims. (Cl. 183—114.2)

This invention relates to an improved adsorption process for the separation of gases, especially the separation of light hydrocarbon gases. The invention relates to an improved process wherein the full use is made of the capacity of an adsorbent at its different activity levels. The invention is specifically adaptable to the separation of light hydrocarbon gases employing activated carbon as the adsorbent.

The process of separating components of gaseous mixtures by means of solid adsorbents has been well described. It is known that components of a mixture having varying degrees of adsorbability may be separated by contacting the mixture with a solid adsorbent whereby the more adsorbable component is adsorbed by the solid in preference to the less adsorbable component. The solid is then treated to recover the more adsorbable component therefrom in a process called desorption. The latter is usually accomplished by heat alone, by a combination of heat and stripping with steam or inert gas, or less usually by washing the adsorbent with a solvent for the adsorbed component.

It is well known that hydrocarbon mixtures, particularly gaseous mixtures, are separated into their components by treating them in intimate contact with solid adsorbents, especially activated carbons, silica gel, alumina, magnesia, and the like. In general it may be said that activated carbons separate the hydrocarbons roughly by molecular weight, the higher-molecular-weight components of the hydrocarbon mixture being more strongly adsorbed by the carbon. On the other hand silica gel usually displays an affinity for the olefinic or more unsaturated hydrocarbons in preference to the less unsaturated or paraffinic type.

In the adsorption-desorption cycle the adsorbent loses some of its adsorptive capacity (becomes deactivated) due to the adsorption thereon of highly adsorbable and physically-bound high molecular weight materials, including hydrocarbon polymers. The extent to which the adsorbent becomes deactivated depends largely on the amount of deactivants present in the feed undergoing separation and the amounts of deactivants formed during the adsorption-desorption cycle. It becomes necessary therefore to continuously reactivate at least a part of the circulating solid adsorbent in order to maintain the adsorbent at the high activity level. This reactivation or regeneration process, the purpose of which is to remove deactivants from the adsorbent, is accomplished by heating at least a portion of the deactivated solid to a higher temperature than that prevailing in the desorption zone. However, on occasion the use of steam is required and where the solid is extremely deactivated the reactivation must be carried out in the presence of steam at such a high temperature that the adsorbent is destroyed to a large degree due to chemical reaction with steam. The latter is especially true in the case of reactivation of spent carbon wherein 10–15% of the primary carbon may be consumed in order to return the char to a high activity level.

It is an object of this invention to minimize adsorbent reactivation requirements, especially as pertaining to activated carbon adsorbent, and at the same time to maintain the circulating adsorber solid at a high activity level.

It is also an object of this invention to minimize adsorbent deactivation, adsorbent circulation, and desorption requirements in a continuous adsorption-desorption cycle.

According to this invention there are employed, for the separation of gaseous mixtures, at least two separate bodies of the same adsorbent, one a body of highly-activated adsorbent and the other or other bodies of less highly activated adsorbent. Each of the bodies of adsorbent performs its own particular function in separating components of the gaseous mixture. The lower activity adsorbent is employed to contact the total gaseous feed stock to adsorb the bulk of the deactivants and at the same time to adsorb the heavier desired component or fraction of the feed mixture. The raffinate gas from the less highly-activated adsorbent contacting is then introduced into the body of highly-activated adsorbent where a further split is made between the light and intermediate components of the gaseous mixture. Novel arrangements are provided for the continuous regeneration and reuse of the spent adsorbent in each body.

The invention will be more readily understood in connection with the description of the process when read in conjunction with the attached flow diagram which is a diagrammatic sketch in elevation of one type of apparatus for carrying out the invention.

The invention will be described in connection with the separation of a gaseous hydrocarbon mixture containing methane and lighter gases such as hydrogen and nitrogen as a light component, $C_2$ hydrocarbons as an intermediate component of the mixture, and $C_3$ and heavier hydrocarbons such as $C_4$, $C_5$, etc. as the heavier component of the mixture, and using activated carbon as the solid adsorbent. Hydrocarbon gases, especially mixtures obtained from petroleum refinery streams, contain in addition to methane and its higher homologues, ethylene and its higher homologues and other more highly unsaturated constituents, particularly diolefins such as styrene, vinyl acetylene, diacetylene, butadiene, isoprene, pentadiene, cyclopentadiene, etc. which are produced by cracking of hydrocarbons and which are highly polymerizable resulting in the formation of high molecular weight compounds easily adsorbed by activated carbons and difficult to desorb therefrom.

Referring to the drawing, a gaseous hydrocarbon feed of the type described is introduced via line 2 into first adsorber 1 into the top of which is fed via line 3 a low-activity carbon. The carbon descends the tower countercurrent to the rising gases. The temperature, time of contact, reflux ratio, amount of carbon circulated, etc. are so controlled that the carbon adsorbs the $C_3$ and heavier hydrocarbons as the most adsorbable components of the feed, while the lean gases passing unadsorbed through the tower via line 4 consist essentially of $C_2$ hydrocarbons, methane and lighter gases such as $H_2$ and $N_2$. The rich adsorbent leaves tower 1 via line 5 and enters the first desorber 6. The latter is equipped with heating means 7 and stripping gas entrance 8. The carbon descends into the desorber vessel and is subject to the action of either heat or stripping gas or both. Steam is the preferred stripping gas. By this action adsorbed components, such as $C_3$ and some heavier components such as $C_4$ and $C_5$ hydrocarbons, are desorbed from the carbon more or less completely, whereas higher molecular weight contaminants including hydrocarbon polymers are retained and subsequently removed in the high temperature reactivator. The net desorbed product is removed via line 9 for further separation by quenching and fractionation. A recycle portion of the desorbed product is refluxed to adsorber 1 via line 30. Hot carbon is removed from desorber 6 via line 10, cooled in cooler 11 and returned to tower 1 via lines 12 and 3 to repeat the cycle.

The lean gases, well cleaned of deactivants and heavier desirable product components, and consisting chiefly of $C_1$ and $C_2$ hydrocarbons, leave tower 1 via line 4, and are introduced into second adsorber tower 13 which is similar in construction and design to tower 1. The gases enter the tower at about the midpoint thereof or below. Into the top of tower 13 there is introduced via line 14 a high activity carbon. This carbon will possess a much higher activity than the carbon circulating through tower 1. The carbon descends tower 13 countercurrently to the upflowing gaseous mixture. The temperature, time of contact, reflux ratio, amount of carbon circulated, etc. are so controlled as to permit the adsorption of the $C_2$ components by the carbon to the exclusion of the methane and lighter gases. The latter ascend the tower unadsorbed and are removed as a light product fraction via line 15. The rich carbon containing essentially $C_2$ hydrocarbons adsorbed thereon leaves tower 13 via line 16 and enters second desorber 17 via line 16. The second desorber is likewise equipped with heating means 18 and stripping gas entrance 19. The rich carbon undergoes desorption in this vessel to release the $C_2$ hydrocarbon components which are removed via line 20. A recycle portion of the desorbed hydrocarbon is refluxed to adsorber 13 via line 31. Only relatively mild desorption conditions of heat and/or stripping are required for this separation, and polymerization will be at a minimum. The denuded carbon, still retaining its high activity due to the absence of appreciable amounts of any contaminating substances and due to the absence of high temperatures in the desorption operation, leaves desorber 17 via line 21 is cooled in cooler 22 and is returned to tower 13 via lines 23 and 14 to repeat the cycle.

To provide for adsorbent activity control, a small portion of the carbon circulating in the low char activity system is withdrawn either continuously or intermittently, preferably from line 10, and introduced via line 25 into reactivator 26. Reactivator 26 may be equipped with indirect heating means 27 for heating reactivator char and gas, or, alternately, superheated reactivator feed gas such as combustion gas or steam may be used to provide heat directly to the reactivator char. Gas line 28 is provided for introducing reactivator feed gas to unit 26. The reactivator gas physically strips deactivating components from the char at higher temperature and/or higher gas/char ratio than in the desorbers 6 and 17, and oxidizing constituents of the gas such as $H_2O$ and $CO_2$ react chemically with the more difficultly desorbable char contaminants to gasify these components and remove them from the char at the high reactivator char temperatures provided. At the same time, a portion of the adsorbent char may be lost due to the oxidizing action of $H_2O$ and $CO_2$, such as by the water gas reaction. The combined stripping and oxidizing action of the gases provide high activity char leaving the reactivator via line 29. The spent reactivator gas and gasified char contaminants are removed from the reactivator via line 30.

Due to the comparatively small quantity of char contaminants in the feed to the second adsorber, char activity for this system may be maintained at a high level at low expense. A portion of the high activity char from this system, preferably from line 21, is introduced to the first adsorber system, preferably via line 24 and 32, at approximately the same average rate as reactivator char is removed from line 10. Thus, the removal of low activity char from the addition of high activity char to the first adsorber provide for the desired char activity control at this system.

The char removed from the second adsorber system via line 24 is replaced partly by fresh char make-up added via line 33 to line 14 (required due to char attrition and reactivator burning losses), and partly by reactivated char via line 29 to the second adsorber system, preferably to line 21. These operations of char removal and additions to the second adsorber provide for high char activity maintenance at the second adsorber system. Any desired difference in carbon activity between the two adsorbers can be maintained, chiefly by control of reactivator char circulation rate and the severity of reactivating conditions.

It has been found experimentally that, for gas-phase separation of the lighter hydrocarbons with activated charcoal, the optimum level of deposits of char contaminants on adsorber char to be controlled varies directly with molecular weight of the feed gas component to be adsorbed. For example, in relation to the adsorptive separation of ethane from methane, adsorptive capacity of charcoal for ethane decreases rapidly with the deposit of contaminants. However, in relation to separation between ethane and propane, the char adsorption capacity for propane does not decrease as rapidly with the level of deposits of char deactivants. Therefore, the optimum equilibrium adsorber char activity to be maintained varies with the nature of the desired separation. Experimental results illustrating the variation in char adsorption capacity with deactivating deposits and adsorbate molecular weight are given as follows:

*Adsorption capacity of deactivated charcoal relative to that for the freshly activated charcoal*

$C_1$, 70% of fresh char capacity for $C_1$
$C_2$, 80% of fresh char capacity for $C_2$
$C_3$, 90% of fresh char capacity for $C_3$ With the above data the advantages of the present invention (as applied to adsorption separation of multicomponent hydrocarbon mixtures of varying molecular weight components into three or more fractions) become obvious. Thus, the heaviest feed component or fraction is adsorbed first with char containing a comparatively high level of deactivating deposits (defined as low-activity char). Intermediate and lighter feed gas fractions are adsorbed with chars at progressively higher activity levels. When char deactivants in the initial feed gas are deposited at a comparatively high level on the first adsorber char, these deactivants may be removed completely in the reactivator with a comparatively low circulation of char to the reactivator, resulting in minimized reactivation requirements such as heating, reactivator gas, and reactivator diameter. Also the first adsorber operates simultaneously as a guard unit for the remaining adsorbers, cleaning the feed gas of char deactivants, such that higher char activity levels may be inexpensively maintained at subsequent adsorbers. At the same time the high level of deposits on the first adsorber char does not reduce adsorptive capacity for the heaviest feed fraction appreciably below that of freshly activated char. On the other hand provision for higher activity char in the subsequent adsorbers is desirable in order to minimize adsorber char circulation rates. Again, for a given reactivator char circulation rate, the higher the level of deposits on char to the reactivator, the lower is the fraction of total char deposits that must be removed per pass through the reactivator in order to purge all the char contaminants from the system. Smaller required fractional removal of char deposits per pass through the reactivator represents greater protection of char in the reactivator against oxidation loss due to steam and $CO_2$, by virtue of the protective residual layer of deposits on char leaving the reactivator. These considerations represent another advantage of the present invention.

The present invention represents substantial advantage over prior art which has taught only the use of a common char stream of the same activity for separation of mixtures into three or more fractions, or the use of a common desorber for multiple adsorbers which implies circulation of equi-activity char to the multiple adsorbers.

Other modifications of the process as represented in the sketch become apparent. Thus, it may be desirable to operate with exit reactivator char in line 29 of lower activity than that of circulating char in the second adsorber, in order to protect the reactivator char against burning loss. In this case the exit reactivator char via line 29 could be returned directly to the first adsorber system, preferably to line 32 via line 34 and only char make-up be conducted from the high activity system to the low-activity system via line 24. The small activity maintenance required for the second adsorber system could be effected by the total fresh char make-up alone, or with fresh char make-up supplemented by an additional char reactivator unit. Depending on the complexity of the overall separation desired, three or more adsorbers could be utilized with at least one adsorber differing in circulating char activity from the others.

The adsorption and desorption towers may be operated with fluidized carbon or a gravitating bed of carbon may be employed. With the fluidized system the vessels are equipped with packing, perforated plates, bubble caps, or other devices so as to promote countercurrent action. Likewise the adsorption and desorption vessels can be combined in one unit. Each adsorber is operated in the manner known to give the best separation possible by the methods now known in the adsorption art. Rectification and side-cutting can also be employed where more than one separation is desired from each adsorber. However, the present invention is not concerned with any of these principles and is restricted to the novel use of high and low activity adsorbent systems in the adsorption process as set forth above. Solid lift systems, gas lift lines, etc. have been purposely omitted from the drawing since these techniques are well known in the art of handling solids of the type used and form no part of the present invention.

For the separation of light gases, such as $N_2$, $H_2$, etc., $C_1$, $C_2$, $C_3$ and heavier hydrocarbons from a gaseous stream, the temperature conditions existing in first and second adsorbers, in the first and second desorbers, and in the reactivator are as follows:

*Low activity char system*

(First adsorber and desorber system)

| | |
|---|---|
| Adsorber temp., °F | 120–250 |
| Desorber temp., °F | 300–525 |

*High activity char system*

(Second adsorber and desorber system)

| | |
|---|---|
| Adsorber temp., °F | 120–250 |
| Desorber temp., °F | 250–450 |

*Reactivator*

| | °F |
|---|---|
| Low temperature stripping stage | 500–800 |
| High temperature stripping stage | 900–1100 |
| High temperature reactivation stage | 1300–1600 |

The operating pressure of the adsorption process is not critical and is usually dictated by the available pressure of the feed gas. For a feed pressure of 100 p. s. i. g. the first adsorber system may operate at 90 p. s. i. g. and the second adsorber system at 85 p. s. i. g. to allow for the normal pressure drop through the first system. The desorbers, due to the pressure build-up of the adsorbent on the fluid process, would operate at slightly higher pressures than the respective adsorbers, say, 92 and 87 p. s. i. g. in the same order. The reactivator pressure is dependent upon the consideration that char must enter the reactivator from the first desorber and still be under sufficient pressure so that it may be circulated to the cooler in the second adsorber-desorber system. This fixes the reactivator operating pressure in the above example at between 92 and 87 p. s. i. g.

Although the invention has been described with respect to the production of three product streams from the mixture treated, this invention also contemplates the production of four, five, or more product streams. For example, if it is desired to separate $C_1$, $C_2$, $C_3$, and $C_4+$ streams respectively, the first adsorber and desorber unit of the drawing is operated in a manner such that the stream of $C_4$ and heavier components is removed from the desorber via line 9, while the $C_3$ component is removed as a sidestream product from the first desorber via line 35.

Similarly, should it be desired to produce five product streams from a petroleum refinery gas stream, the same may be accomplished in the following manner. The first adsorber and desorber are operated such that a $C_5$ and heavier product stream is removed from the desorber via line 9, a $C_4$ product is removed as a sidestream from tower 1 via line 35. The overhead gases comprising the light ends and $C_1$ to $C_3$ hydrocarbons are removed via line 4 and fractionated in the second adsorber and desorber system in such a manner that the $C_3$ component stream is removed from the second desorber via line 20. A $C_2$ product stream is removed from the second adsorber as a sidestream via line 36, while the methane and lighter components are recovered overhead from the second adsorber via line 15.

The above described sidestream principle is well known in the hydrocarbon fractionation art employing solid adsorbents and represents a most economical method of separation. However, should one desire, the fractionation may be accomplished by employing as many separate adsorption zones and desorption zones as are required eliminating the side-cutting or sidestream removal altogether.

Having described the invention in a manner so that it can be practiced by those skilled in the art, what is claimed is:

1. A process for the separation of a number of components of a gaseous mixture of successively decreasing adsorbabilities with respect to a solid adsorbent, which comprises contacting the gaseous mixture successively in a series of adsorption zones containing adsorbent of successively increasing activities, whereby the components of greatest adsorbability are adsorbed by adsorbent of lowest activity, the unadsorbed components continuing through the series of adsorption zones until the components of lowest adsorbabilities are separated by the adsorbent of highest activity.

2. A process according to claim 1 in which a mixture comprising $C_1$–$C_5$ hydrocarbons is separated by contacting successively with activated carbon of successively increasing activity.

3. A process for the separation of components of a gaseous mixture comprising a less readily adsorbed component A, a most readily adsorbable component C, and an intermediate component B by means of adsorption by a solid adsorbent which comprises contacting the gaseous mixture in a first adsorption zone with a solid adsorbent of reduced activity, separating an unadsorbed gaseous stream comprising components A and B from a first rich adsorbent containing component C adsorbed thereon, contacting the gaseous stream comprising components A and B with a solid adsorbent of high activity in a second adsorption zone, and separating an unadsorbed gaseous stream comprising component A from a second rich adsorbent containing component B adsorbed thereon.

4. A process according to claim 3 in which the solid adsorbent is activated carbon.

5. A process for the separation of components of a gaseous mixture comprising a less readily adsorbed component A, a most readily adsorbable component C and an intermediate component B by means of adsorption with a solid adsorbent which comprises contacting the gaseous mixture in a first adsorption zone with a solid adsorbent of reduced activity, removing a gaseous stream comprising unadsorbed components A and B from the first adsorption zone, removing a first rich adsorbent containing adsorbed thereon component C, desorbing component C from the first rich adsorbent, contacting the gaseous stream comprising components A and B with a solid adsorbent of high activity in a second adsorption zone, separating an unadsorbed gaseous stream comprising component A from the second adsorption zone, removing a second rich adsorbent containing component B adsorbed thereon and desorbing component B from said second rich adsorbent.

6. A process according to claim 5 in which the solid adsorbent is activated carbon.

7. A process for the separation of a gaseous mixture containing methane and lighter gases, $C_2$ hydrocarbons and $C_3$ and heavier hydrocarbons which comprises contacting the gaseous mixture with activated carbon of reduced activity in a first adsorption zone, separating an unadsorbed gaseous stream comprising $C_2$ hydrocarbons, methane and lighter gases from a first rich adsorbent containing $C_3$ and heavier hydrocarbons adsorbed thereon, contacting the gaseous stream comprising $C_2$ hydrocarbons, methane and lighter gases in a second adsorption zone with activated carbon of high activity and separating an unadsorbed gaseous stream comprising methane and lighter gases from a second rich activated carbon containing $C_2$ hydrocarbons adsorbed thereon.

8. A process for the separation of a gaseous mixture containing methane and lighter gases, $C_2$ hydrocarbons, and $C_3$ and heavier hydrocarbons which comprises contacting the gaseous mixture with activated carbon of reduced activity in a first adsorption zone, separating a gaseous stream comprising unadsorbed $C_2$ hydrocarbons, methane and lighter gases from a first rich activated carbon containing $C_3$ and heavier hydrocarbons adsorbed thereon, desorbing $C_3$ and heavier hydrocarbons from the first rich carbon leaving a first lean activated carbon, contacting the gaseous stream comprising unadsorbed $C_2$ hydrocarbons, methane and lighter gases in a second adsorption zone with activated carbon of high activity, separating a gaseous stream comprising unadsorbed methane and lighter gases from a second rich activated carbon containing $C_2$ hydrocarbons adsorbed thereon, and desorbing $C_2$ hydrocarbons from the second rich activated carbon leaving a second lean activated carbon.

9. A process according to claim 8 in which a portion of the first lean activated carbon is regenerated and introduced as high activity carbon into the second adsorption zone.

10. A process according to claim 8 in which a portion of the first lean activated carbon is regenerated and introduced as higher activity carbon into the first adsorption zone.

11. A process according to claim 8 in which a portion of the second lean carbon is introduced as reduced activity carbon into the first adsorption zone.

12. A process according to claim 8 in which a portion of the second lean carbon is regenerated and introduced as higher activity carbon into the second adsorption zone.

13. A process according to claim 12 in which fresh char make up for the first adsorption zone is added initially to the second adsorption zone.

EDWARD W. S. NICHOLSON.
ROBERT J. FRITZ.
LEWIS D. ETHERINGTON.

REFERENCES CITED

The following references are of record in the file of this patent:

UNITED STATES PATENTS

| Number | Name | Date |
|---|---|---|
| 2,523,149 | Scheeline | Sept. 19, 1950 |
| 2,539,005 | Berg | Jan. 23, 1951 |
| 2,548,502 | Small | Apr. 10, 1951 |